United States Patent [19]

Cageao et al.

[11] Patent Number: 5,770,674

[45] Date of Patent: Jun. 23, 1998

[54] METHOD OF PRODUCING GASKETS FROM POLYURETHANE/UREA COMPOSITIONS AND GASKETS PRODUCED THEREFROM

[75] Inventors: Ronald A. Cageao, Beaver, Pa.; A. Donald Meltzer, Brecksville, Ohio; Brian R. Suddaby, Pittsburgh, Pa.

[73] Assignee: Bayer Corporation, Pittsburgh, Pa.

[21] Appl. No.: 744,037

[22] Filed: Nov. 5, 1996

Related U.S. Application Data

[63] Continuation-in-part of Ser. No. 484,402, Jun. 7, 1995, abandoned.

[51] Int. Cl.$^6$ .......................... C08G 18/79; C08G 18/40; C08G 18/48; B65D 53/06
[52] U.S. Cl. .......................... 528/73; 156/99; 156/107; 264/216; 264/252; 264/259; 264/261; 264/275; 264/277; 264/279; 277/97; 277/237 R; 277/277; 277/DIG. 9; 428/38; 428/81; 428/83; 428/192; 528/49; 528/59; 528/60; 528/61; 528/65; 528/66; 528/68; 528/76; 528/77; 528/85; 296/201
[58] Field of Search ..................... 156/99, 107; 264/216, 264/252, 259, 261, 275, 277, 279; 277/97, 237 R, DIG. 9, 277; 428/38, 81, 83, 192; 528/49, 59, 60, 61, 65, 66, 73, 76, 85, 68, 77; 296/201

[56] References Cited

U.S. PATENT DOCUMENTS

| | | | |
|---|---|---|---|
| 3,183,285 | 5/1965 | Boylan | 264/45 |
| 3,263,014 | 7/1966 | Deisenroth | 264/261 |
| 3,381,340 | 5/1968 | Chapin, Jr. | 18/36 |
| 3,807,146 | 4/1974 | Witkowski | 55/357 |
| 4,218,543 | 8/1980 | Weber et al. | 521/51 |
| 4,543,283 | 9/1985 | Curtze et al. | 428/38 |
| 4,561,625 | 12/1985 | Weaver | 249/85 |
| 4,642,320 | 2/1987 | Turner et al. | 521/176 |
| 4,755,339 | 7/1988 | Reilly et al. | 264/252 |
| 4,764,543 | 8/1988 | Savina | 521/160 |
| 4,772,639 | 9/1988 | Pilger et al. | 521/124 |
| 4,839,122 | 6/1989 | Weaver | 264/129 |
| 4,937,366 | 6/1990 | Nodelman | 521/163 |
| 5,255,483 | 10/1993 | Agrawal et al. | 52/397 |
| 5,260,346 | 11/1993 | Cassidy et al. | 521/159 |
| 5,261,721 | 11/1993 | Conger et al. | 296/146.15 |
| 5,264,270 | 11/1993 | Agrawal | 428/192 |

FOREIGN PATENT DOCUMENTS 57-158481  9/1982  Japan .

OTHER PUBLICATIONS

"New opportunities emerging from a shakeout in solar–energy systems" in Modern Plastics, Mar. 1961, pp. 58–59.

"RIM–urethane solar panel incorporates molded–in plate glass: A diary of an (almost) impossible project", by Carl M. Burgess in Plastics Machinery & Equipment, vol. 8, No. 7, pp. 11–12, Jul. 1979.

*Primary Examiner*—Rabon Sergent
*Attorney, Agent, or Firm*—Joseph C. Gil; N. Denise Brown

[57] ABSTRACT

The present invention is directed to a method of forming a gasket around a substrate from a novel polyurethane/urea composition via the RIM process. Window gaskets may be produced by this method. These novel polyurethane/urea compositions comprise the reaction product of a (cyclo) aliphatic polyisocyanate having a viscosity of less than about 25,000 mPa·s at 25° C. and a NCO functionality of 2.0 to 4.0 with an isocyanate-reactive component comprising b1) a relatively high molecular weight organic compound containing hydroxyl groups, amine groups, or mixtures thereof; and b2) a low molecular weight chain extender selected from the group consisting of diols, primary amines, secondary amines, aminoalcohols, and mixtures thereof; in the presence of a catalyst. The isocyanate and isocyanate-reactive components are selected such that the crosslinking density of the resultant polyurethane/urea composition is at least 0.3 moles/kg. It is also possible that the isocyanate-reactive component comprises b3) a low molecular weight chain terminator, and/or b4) a low molecular weight crosslinking agent. When either or both of these components are included in the isocyanate-reactive component, A, b1), b2), and/or b3) and/or b4) must be selected such that the crosslinking density of the resultant polyurethane/urea composition is at least 0.3 moles/kg.

15 Claims, 4 Drawing Sheets

METHOD OF PRODUCING GASKETS FROM POLYURETHANE/UREA COMPOSITIONS AND GASKETS PRODUCED THEREFROM

CROSS-REFERENCE TO RELATED APPLICATIONS

This application is a Continuation-In-Part of application Ser. No. 08/484,402 filed on Jun. 7, 1995 now abandoned.

BACKGROUND OF THE INVENTION

The present invention relates to a method of forming a gasket of a polyurethane/urea composition along one or more edges of a substrate, and to gaskets produced from these polyurethane/urea resin compositions. A particular type of gasket to be produced from these novel polyurethane/urea resin compositions is a window gasket.

The production of polyurethane moldings via the reaction injection molding (i.e., RIM) technique is well known and described in, for example, U.S. Pat. No. 4,218,543. The RIM process involves a technique of filling a mold by which highly reactive, liquid starting components are injected into the mold within a very short time by means of a high output, high pressure dosing apparatus after they have been mixed in so-called "positively controlled mixing heads".

In the production of polyurethane moldings via the RIM process, the reaction mixture generally comprises an A-side based on polyisocyanates and a B-side based on organic compounds containing isocyanate-reactive hydrogen atoms, in addition to suitable chain extenders, catalysts, blowing agents, and other additives. The polyisocyanates which are typically employed for a commercial RIM process are the aromatic isocyanates, such as, for example, diphenyl methane-4,4'-diisocyanate (i.e., MDI).

Aliphatic isocyanates are broadly disclosed in the long list of suitable isocyanates for use in a RIM process in various patents, including, for example, U.S. Pat. No. 4,937,366. High productivity commercial RIM processes require a 30 s demold time, and prefer mold temperatures less than 80° C. for worker safety and energy efficiency.

U.S. Pat. No. 4,772,639 describes a process for the production of polyurethane moldings reacting organic polyisocyanates with organic compounds containing isocyanate-reactive hydrogen atoms in the presence of catalysts and auxiliary agents inside a closed mold. The isocyanate component is based on (a1) mixtures of (i) 1-isocyanato-3,3,5-trimethyl-5-isocyanatomethylcyclohexane (IPDI), and (ii) polyisocyanates containing isocyanurate groups prepared by the trimerization of a portion of the isocyanate groups of 1,6-diisocyanato-hexane, or (a2) (i) IPDI and (iii) polyisocyanates containing isocyanurate groups prepared by the trimerization of a portion of the isocyanate groups of a mixture of 1,6-diisocyanatohexane and IPDI. These reaction mixtures are broadly disclosed as being suitable for RIM processing. However, the reference requires unusually long demold times, i.e., from 3 to 10 minutes. These long demold times are deleterious to a commercial molding operation.

IPDI contains a sterically hindered isocyanate group. In general, this isocyanate tends to slow down the reactivity of the entire system, which makes it less desirable to use commercially. Higher mold temperatures and/or longer demold times are generally necessary for systems based on IPDI. U.S. Pat. No. 4,772,639 clearly requires that at least 10% by weight of the IPDI monomer be used.

U.S. Pat. No. 4,642,320 discloses a process for the preparation of a molded polymer inside a closed mold with a reaction mixture comprising (a) an active hydrogen-containing material comprising a primary or secondary amine terminated polyether having an average equivalent weight of at least 500, (b) at least one chain extender, and (c) an aliphatic polyisocyanate, polyisothiocyanate, or mixture thereof, wherein the NCX index is from about 0.6 to 1.5. The term NCX index is the ratio of the total number of NCO and/or NCS equivalents to the total number of hydrogen equivalents contained in the formulation. Suitable groups containing hydrogen atoms reactive with NCO and/or NCS groups include, OH, SH, NH and the like.

The process disclosed by U.S. Pat. No. 4,642,320 requires that component (a) have at least 25%, and preferably 50% of its active hydrogen atoms present in the form of amine hydrogens. All of the examples disclose a system based on a HDI prepolymer with amine terminated polyethers and diethyltoluene diamine at high mold temperatures and long demold times. The isocyanate used in the examples is difunctional, and contains at least 39% by weight of HDI monomer. Although the reference discloses aliphatic isocyanates are suitable for this process, the mold temperatures are high, i.e., at least 90° C., and the demold times range from about 1 to 5 minutes.

U.S. Pat. No. 4,764,543 discloses aliphatic RIM systems with short demold times (~10 seconds) and low mold temperatures (~70° C.) that use very fast reacting aliphatic polyamines. This patent is restricted to total polyurea systems based on chain extenders which are cycloaliphatic diamines and polyethers which are amine-terminated polyethers. All of the working examples of this patent use methylene bis(4-cyclohexylisocyanate) which is difunctional, and 100% monomer.

U.S. Pat. No. 5,260,346 also discloses reaction systems for preparing elastomers via the RIM process. These systems require an allophanate modified polyisocyanate, a hydroxyl group containing polyol, and an aromatic polyamine having at least one of the positions ortho to the amine substituted with a lower alkyl substituent.

Various U.S. patents and journal articles disclose numerous methods of making or producing gaskets around substrates including windows for automobiles, filter assemblies, solar collectors or solar panels, etc. These include, for example, U.S. Pat. Nos. 3,183,285, 3,263,014, 3,381,340, 3,807,146, 4,543,283, 4,561,625, 4,755,339 and 4,839,122; Japanese Patent 57-158481; and articles such as "New opportunities emerging from a shakeout in solar-energy systems" in Modern Plastics, 1961, pp. 58–59; and "RIM-urethane solar panel incorporates molded-in plate glass: A diary of an (almost) impossible project" by Carl M. Burgess in Plastics Machinery & Equipment, Vol. 8, No. 7, pp. 11–12.

Polyurethane and other materials are disclosed in several of these patents as being suitable for forming a gasket around a substrate, particularly glass. However, all of these references fail to provide materials that are resistant to squeak when rubbed against a rigid surface such as painted sheet metal.

A problem in applying molded articles based on polyurethane systems to the area of window gaskets is the tendency to squeak when rubbed against painted sheet metal. If the gasket is in contact with a rigid frame, such as painted sheet metal, vibrations in the assembly produce audible noise. This noise is commonly referred to as a squeak. If the window gasket/frame assembly is subjected to repeated vibrations, such as in an automobile traversing a bumpy road, the squeak noise generated can be very irritating to a person close to the noise source. Elimination of squeaks is very important to the manufacturers of automobiles or other assemblies that use these types of gaskets.

A simple method of eliminating squeaks is to apply a lubricating coating to one or both of the surfaces. Such a coating is described in U.S. Pat. No. 5,255,483. This method has several drawbacks. If an adhesive is used to bond the gasket to the rigid frame, adhesion may be lost or the barrier to moisture may be compromised by trace amounts of the lubricating coating. The durability of the coating may degrade from repeated vibrations, exposure to moisture, or temperature cycles. If the coating is post applied, it requires additional material and labor costs. Preferable to an anti-squeak coating would be a method of making the gasket material inherently less prone to generating the squeak noises.

SUMMARY OF THE INVENTION

It was an object of the present invention to develop a method for producing a gasket for various substrates, including glass, wherein the gasket does not squeak when vibrated against rigid surfaces, such as painted sheet metal. It was discovered that certain polyurethane/urea compositions can be used to form gaskets which perform remarkably well with respect to the tendency to prevent squeaks. Although it is possible to achieve this with coatings as discussed above, the present invention does not require the use of such coatings. Rather, it requires specific polyurethane/urea compositions comprising the reaction product of a specific (cyclo)aliphatic isocyanate, an isocyanate-reactive mixture comprising at least one high molecular weight compound and at least one low molecular weight chain extender, and one or more catalysts wherein the isocyanate and isocyanate-reactive components are selected such that the resultant polyurethane/-urea composition has a crosslink density of at least 0.3 moles/kg.

Polyurethane/urea compositions having this crosslink density have been found to be suitable as materials for gaskets. Gaskets produced from these compositions do not squeak when rubbed against painted sheet metal, they can be demolded in 30 seconds, and processed at temperatures below 90° C.

The present invention is directed to a method of forming a gasket of these particular polyurethane/urea compositions along one or more edges of a substrate, and to gaskets produced from these polyurethane/urea resin compositions. A particular type of gasket to be produced from these novel polyurethane/urea resin compositions is a window gasket.

This invention also relates to gaskets produced by this method, and particularly to window gaskets.

The specific polyurethane/urea compositions suitable for the present invention are described in detail below.

DETAILED DESCRIPTION OF THE INVENTION

Figure 1:
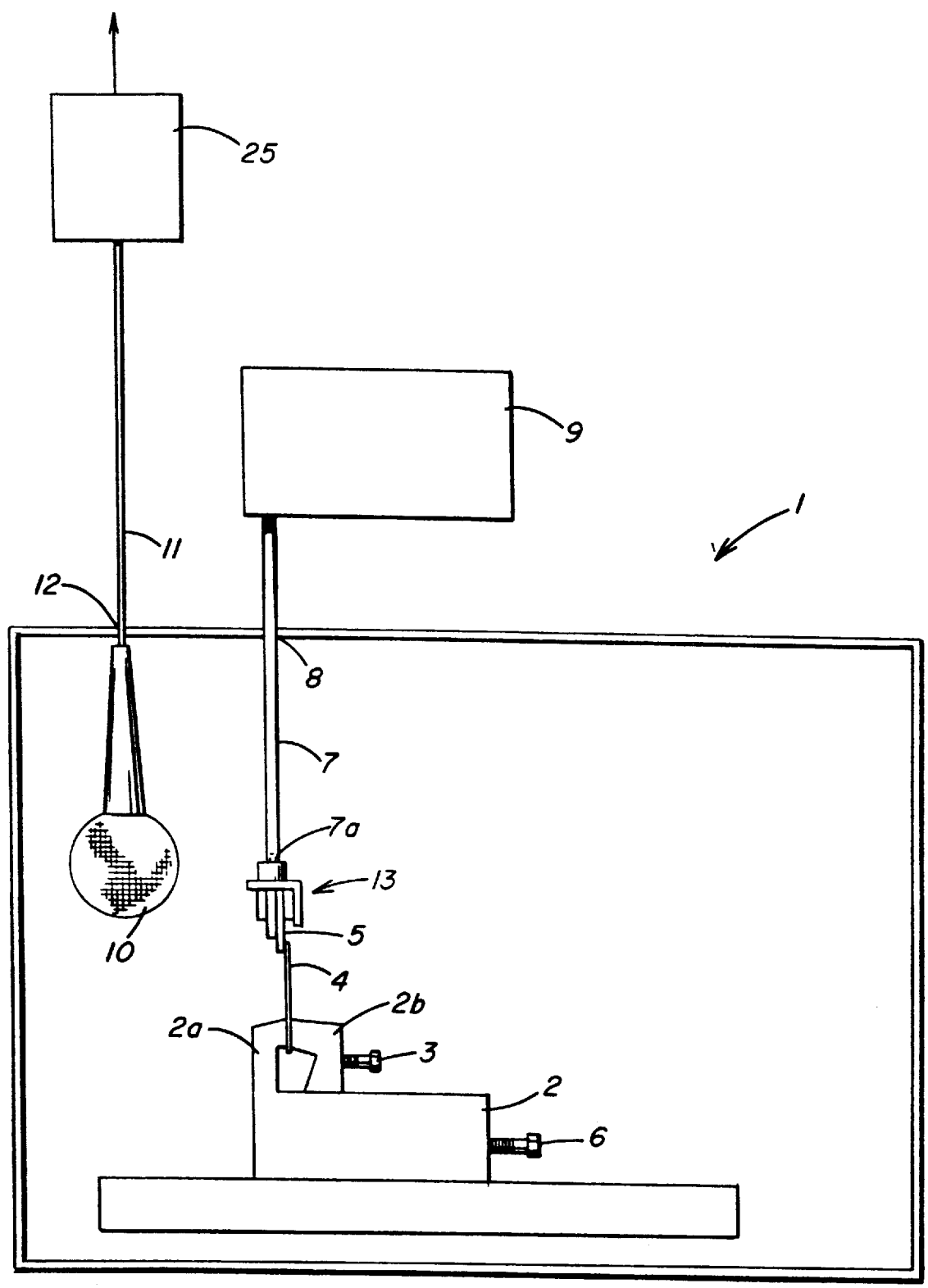
FIG. 1 illustrates one simple arrangement of testing equipment which can be used to assess a molded article composed of gasket material for squeak intensity.

The present invention relates to a method of forming a gasket of polyurethane/urea composition along one or more edges of a substrate, wherein the polyurethane/urea composition is characterized by a crosslink density of at least 0.3 moles/kg, and to gaskets produced from this specific polyurethane/urea resin composition. A particular type of gasket to be produced from this polyurethane/urea resin composition is a window gasket.

This gasket is formed by placing at least a portion of a substrate in a mold, injecting a solidifiable polyurethane/urea composition into a cavity space defined between the surface of the edge(s) of the substrate and the internal surface of the mold, and removing the substrate from the mold after solidification of the novel polyurethane resin. It is preferred that the whole substrate be placed in a mold, and that the solidifiable polyurethane/urea composition is injected into a cavity space defined between the surface of the edge(s) of the substrate and the internal surface of the mold, such that a gasket is formed around the entire outer edges or circumference of the substrate.

The polyurethane/urea composition suitable for forming the gasket comprises reacting:

A) a (cyclo)aliphatic polyisocyanate having a viscosity of less than about 25,000 mPa·s at 25° C. and an average NCO functionality of 2.0 to 4.0, with B) an isocyanate-reactive component comprising b1) from about 60 to 99% by weight, preferably 70 to 95% by weight, based on the weight of isocyanate-reactive components, of at least one compound having an average functionality of from 1 to 8 and a molecular weight of from about 401 to 10,000, preferred about 424 to 6000, and most preferred about 500 to 4000, and containing at least one of the functional groups selected from the group consisting of hydroxyls, amines, imines, and mixtures thereof, and b2) from about 1 to 40% by weight, preferably 5 to 30% by weight, based on the weight of isocyanate-reactive components, of an organic chain extender having a molecular weight of from 61 to 400, an average functionality of about 2, and being selected from the group consisting of alcohols, primary amines, secondary amines, aminoalcohols and mixtures thereof, in the presence of C) from 0.1 to 10% by weight, preferably from 0.5 to 5% by weight, based on the isocyanate-reactive components, of at least one catalyst, wherein said reaction mixture is processed via the one-shot process at an isocyanate index of 80 to 115, preferably 85 to 115, and said A), b1) and b2) are selected such that the resultant polyurethane/urea composition contains a crosslink density of at least 0.3 moles/kg, preferably greater than 0.35 moles/kg.

It is also within the scope of the present invention that this reaction mixture may additionally comprise:

b3) from about 0 to 15% by weight, preferably 0 to 10% by weight, based on the weight of isocyanate-reactive components, of an organic chain terminator having a molecular weight of from 32 to 400, preferably 74 to 150, an average functionality of about 1, and being selected from the groups consisting of alcohols, primary amines, secondary amines and mixtures thereof. When the reaction mixture additionally comprises component b3), the combination of components A), b1), b2) and b3) must be selected such that the resultant polyurethane/urea composition contains a crosslink density of at least 0.3 moles/kg.

It is also within the scope of the present invention that this reaction mixture may additionally comprise:

b4) from about 0 to 20% by weight, preferably 0 to 14% by weight, based on the weight of isocyanate-reactive components, of an organic crosslinker having a molecular weight of from 90 to 400, preferably 118 to 192, an average functionality greater than 2, preferably 3 to 8, and being selected from the group consisting of organic alcohols, organic amines, aminoalcohols and mixtures thereof.

When the reaction mixture additionally comprises component b4), the combination of components A), b1), b2), b4) and optionally, b3) must be selected such that the resultant polyurethane/urea composition contains a crosslink density of at least 0.3 moles/kg.

In a preferred embodiment of the invention, the (cyclo)aliphatic polyisocyanate contains at least one functional group which is selected from the group consisting of a1) isocyanurate groups,
a2) biuret groups,
a3) uretdione groups,
a4) urethane groups,
a5) allophanate groups,
a6) carbodiimide groups,
a7) uretone imine groups, and
a8) blends thereof.

In another preferred embodiment of the invention, the catalyst comprises:

c1) from 0.1 to 10% by weight of at least one catalyst selected from the group consisting of metal carboxylates, metal halides, ammonium carboxylates, and mixtures thereof, c2) from 0.1 to 10% by weight of at least one tin-sulfur catalyst, and c3) from 0.1 to 10% by weight of at least one tertiary amine; wherein the amount of components c1), c2) and c3) total 0.1 to 10% by weight, based on the weight of components B) and C).

The catalyst composition most preferably comprises from 0.5 to 5.0% by weight of component c1); from 0.0 to 5.0% by weight of component c2); and from 0.0 to 5.0% by weight of component c3), wherein the amount of components c1), c2) and c3) total 0.5 to 5% by weight, based on the weight of components B) and C).

As used herein, the term crosslink density is defined as follows:

$$\frac{\sum_i (F_i - 2) M_i}{\sum_i W_i}$$

wherein:
$F_i$ is the functionality of the compound,
$M_i$ is the number of moles of the compound, and
$W_i$ is the molecular weight of the compound.

A description of the crosslinking density and concept can be found in "Principles of Polymer Science", Chapter 9, by P. J. Flory, Cornell University Press, Ithaca, N.Y., 1953.

The term molecular weight in the above described polyurethane/urea composition refers to number average molecular weight. The number average is also described in "Principles of Polymer Science", pp. 273–4, by P. J. Flory, Cornell University Press, Ithaca, N.Y., 1953.

The use of the term "blends" with respect to the polyisocyanate component of the present invention is meant to include both physical blends and chemical mixtures.

The above method can be used to form gaskets on all types of substrates, including glassplates or sheets, metal plates, bars, rails, rigid plastics (such as, for example, polycarbonates), insulated electrical wires and cables, composite materials, such as glass fibers/polymer composites, and electronic components. Glass is preferred. This method is particularly suitable for forming window gaskets wherein the substrate comprises a glass sheet or panel. Window gaskets produced in accordance with the present invention have a greatly reduced tendency for squeaking as is known to occur in prior art gaskets.

Suitable substrates for the present invention may optionally be treated with an adhesion promoter before molding the gasket onto the substrate. In the case of glass or metal substrates, an amino silane adhesion promoter such as, for example, Lord Corporation's Chemlok® 144, is preferred.

In accordance with the present invention, the (cyclo)aliphatic polyisocyanate component has a viscosity of less than about 25,000 mPa·s at 25° C. and an average NCO functionality of 2.0 to 4.0. As used herein, the term (cyclo) aliphatic may represent either an aliphatic isocyanate or a cycloaliphatic isocyanate.

Suitable polyisocyanates for the present invention include, for example, organic (cyclo)aliphatic diisocyanates and polyisocyanates such as, for example, aliphatic diisocyanates such as 1,4-tetramethylene diisocyanate, 1,6-hexamethylene diisocyanate, 2-methylpentyl-1,5-diisocyanate, 2,2,4-trimethyl-1,6-hexamethylene diisocyanate, 1,12-dodecamethylene diisocyanate, cycloaliphatic diisocyanates such as cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 2,4'-dicyclohexylmethane diisocyanate, 1,3- and 1,4-bis (isocyanatomethyl)-cyclohexane, bis-(4-isocyanato-3-methylcyclohexyl)-methane, α,α,α',α'-tetramethyl-1,3- or -1,4-xylylene diisocyanate, 2,4-and/or 2,6-hexahydrotoluene diisocyanate, and mixtures thereof. It is preferred that the isocyanate be based on 1,6-hexamethylene diisocyanate, or bis-(4-isocyanatocyclohexyl)-methane.

In accordance with the present invention, it is preferred that the (cyclo)aliphatic polyisocyanate component having a viscosity of less than about 25,000 mPa·s at 25° C. and having an average NCO functionality of 2.0 to 4.0, be present in the form of an NCO prepolymer or a polyisocyanate adduct, more preferably a polyisocyanate adduct.

Suitable polyisocyanate adducts for the present invention may be based on any of the organic (cyclo)aliphatic diisocyanates and polyisocyanates such as, for example, those described hereinabove.

Suitable polyisocyanate adducts containing biuret groups include polyisocyanates such as those described, for example, in U.S. Pat. Nos. 3,124,605, 3,358,010, 3,644,490, 3,862,973, 3,906,126, 3,903,127, 4,051,165, 4,147,714, and 4,220,749, the disclosures of which are herein incorporated by reference. As set forth in these patents, these biuret group-containing polyisocyanates may be prepared by using co-reactants such as water, primary and secondary monoamines, and primary and/or secondary diamines. These polyisocyanates preferably have an NCO content of 18 to 22% by weight and an average NCO functionality of 2.3 to 4.0, preferably of 3 to 3.5.

Suitable polyisocyanates containing isocyanurate groups include compounds such as those described, for example, in U.S. Pat. Nos. 4,288,586 and 4,324,879, the disclosures of which are herein incorporated by reference; European Patents 3,765, 10,589 and 47,452, the disclosures of which are herein incorporated by reference; and German Offenlegungsschriften 2,616,416, herein incorporated by reference. The isocyanato-isocyanurates generally have an average NCO functionality of 2.3 to 4.0, preferably of 3 to 3.5, and an NCO content of 5 to 30%, preferably 10 to 25% and most preferably 15 to 25% by weight.

Uretdione diisocyanates may be prepared by oligomerizing a portion of the isocyanate groups of a diisocyanate in the presence of a trialkyl phosphine catalyst, and may be used in admixture with other aliphatic and/or cycloaliphatic polyisocyanates, particularly the isocyanurate group-containing polyisocyanates described hereinabove.

Urethane group-containing polyisocyanates which may be prepared in accordance with the process disclosed in U.S. Pat. No. 3,183,112, herein incorporated by reference, by reacting excess quantities of isocyanates, preferably diisocyanates, with low molecular weight glycols and polyols having molecular weights of less than 400, such as trimethylol propane, glycerine, 1,2-dihydroxy propane and mixtures thereof. It is also possible to prepare urethane group-containing polyisocyanates, by the same process as described in U.S. Pat. No. 3,183,112, from relatively high molecular weight glycols and polyols instead of low molecular weight glycols and polyols.

Allophanate group-containing polyisocyanates include, for example, those prepared according to the processes disclosed in U.S. Pat. Nos. 3,769,318, 4,160,080 and 4,177,342, the disclosures of which are herein incorporated by reference. These have a functionality of from 2.2 to 4, and preferably 2.2 to 3.2.

It is also within the scope of the present invention for the polyisocyanate to contain two or more types of functional groups such as, for example, a polyisocyanate containing both isocyanurate groups and allophanate groups. Isocyanates containing both of these types of functional group may be prepared in accordance with the processes set forth in U.S. Pat. Nos. 5,124,427, 5,208,334 and 5,235,018; the disclosures of which are herein incorporated by reference. These polyisocyanates containing isocyanurate and allophanate groups preferably have an NCO content of 16 to 22% by weight, most preferably of 18 to 21% by weight.

Suitable carbodiimide group-containing and uretone imine group-containing polyisocyanates for the present invention include, for example, those which may be prepared by oligomerizing di- or polyisocyanates in the presence of known carbodiimidization catalysts such as described in, for example, German Patentschriften 1,092,007, herein incorporated by reference, U.S. Pat. 3,152,162, herein incorporated by reference, and German Offenlegungsschriften 2,504,400, 2,537,685 and 2,552,350, the disclosures of which are herein incorporated by reference.

Preferred polyisocyanate adducts are the polyisocyanates containing isocyanurate groups, or polyisocyanates containing both isocyanurate and allophanate groups. Isocyanurate group-containing polyisocyanates suitable for the present invention generally have an average NCO functionality of about 2.0 to 4.0 and a viscosity of less than about 25,000 mPa·s at 25° C. Polyisocyanates containing isocyanurate and allophanate groups generally have an average NCO functionality of about 2.3 to 4.0 and a viscosity of less than about 20,000 mPa·s at 25° C.

It is more preferred to use isocyanurate group-containing polyisocyanates as component a1) which are prepared, for example, by trimerizing a portion of the isocyanate groups of 1,6-hexamethylene diisocyanate; containing tris-(6-isocyanatohexyl)-isocyanurate and higher homologs thereof; and having an NCO content of about 20 to 23% by weight, a monomeric diisocyanate content of <2%, a viscosity at 25° C. of less than 10,000 mPa·s and an average isocyanate (i.e., NCO) functionality of about 3 to 3.5. Suitable compounds include isocyanurate group-containing polyisocyanates such as those described, for example, in U.S. Pat. Nos. 4,288,586 and 4,324,879, the disclosures of which are herein incorporated by reference. Low monomer content polyisocyanates such as these significantly decrease health concerns and risks associated with handling polyisocyanates.

Another more preferred group of polyisocyanate adduct includes the polyisocyanates containing isocyanurate and allophanate groups that are based on 1,6-hexamethylene diisocyanate. Suitable such compounds generally have an NCO content of from 16 to 22% by weight, and a viscosity of less than about 3000 mPa·s at 25° C. Some examples of suitable isocyanates include, for example, those compounds described, for example, in U.S. Pat. Nos. 5,124,427, 5,208,334, and 5,235,018, the disclosures of which are herein incorporated by reference. These polyisocyanates also contain low quantities of monomeric isocyanates.

Another more preferred group of polyisocyanate adducts includes the polyisocyanates containing uretdione groups that are based on 1,6-hexamethylene diisocyanate. Suitable such compounds generally have an NCO content of from about 20 to 24% by weight, a functionality of about 2.2 to 2.8, and a viscosity of less than about 500 mPa·s at 25° C.

A most preferred isocyanurate group-containing polyisocyanate to be used as component a1) can be prepared from 1,6-hexamethylene diisocyanate and having an isocyanate content of about 21.6%, a content of monomeric diisocyanate of <0.2%, and a viscosity at 25° C. of about 3000 mPa·s.

A most preferred biuret group-containing polyisocyanate to be used as component a2) of the invention can be prepared from 1,6-hexamethylene diisocyanate and having an isocyanate content of about 23%, a content of monomeric diisocyanate of <0.7% and a viscosity at 25° C. of about 1300 to 2200.

A most preferred polyisocyanate containing isocyanurate and allophanate groups to be used as the isocyanate component can be prepared from 1,6-hexamethylene diisocyanate and 1-butanol, and has an isocyanate content of about 18 to 21% by weight such as described, for example, in U.S. Pat. No. 5,124,427, herein incorporated by reference. This preferred polyisocyanate component has an isocyanate content of about 18 to 21% by weight, a viscosity at 25° C. of less than about 1500 mPa·s, and a monomeric diisocyanate content of <0.7%.

Suitable isocyanate reactive components according to the present invention comprise b1) at least one high molecular weight compound having a number average molecular weight of from about 401 to 10,000, preferred 424 to 6000, and most preferred 500 to 4000, an average functionality of from 1 to 8, preferably 2 to 4, and containing at least one of the functional groups selected from the group consisting of hydroxyls, amines, imines, and mixtures thereof; and b2) a low molecular weight chain extender having a number average molecular weight of from 61 to 400, preferably 61 to 192, an average functionality of 2, and being selected from the group consisting of alcohols, primary amines, secondary amines, aminoalcohols and mixtures thereof.

It is also possible that the isocyanate-reactive component additionally comprise b3) a low molecular weight organic chain terminator having a number average molecular weight of from 32 to 400, preferably 74 to 150, an average functionality of about 1, and being selected from the groups consisting of alcohols, primary amines, secondary amines and mixtures thereof.

In addition, the isocyanate-reactive component may also comprise b4) a low molecular weight organic crosslinker having a number average molecular weight of from 90 to less than 400, preferably 118 to 192, an average functionality of greater than 2, preferably 3 to 8, and being selected from the group consisting of organic alcohols, organic amines, aminoalcohols and mixtures thereof.

The isocyanate-reactive component B) to be used in the process according to the invention comprises components b1) at least one compound containing hydroxyl groups, amino groups (preferably primary and/or secondary amines), imino groups, and mixtures thereof. Examples of suitable compounds to be used as component b1) include the polyethers, polyesters, polythioethers, polyacetals, polycarbonates, and amine terminated polyethers containing from 1 to 8 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine, ethylene diamine and toluene diamine. It is preferred to use polyethers which contain substantial amounts of primary hydroxyl groups in terminal positions (greater than 80% by weight, based on all of the terminal hydroxyl groups present in the polyether).

Polyether polyols are preferably used as component b1) in the invention. Preferred polyethers include, for example, those compounds based on di- or tri-functional starters such as, for example, water, ethylene glycol, propylene glycol, glycerin, trimethylolpropane, or triethanolamine. These preferred compounds include copolymers of ethylene oxide and propylene oxide with greater than 15% by weight of the oxides being ethylene oxides.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Also suitable are so-called amine terminated polyethers containing primary or secondary (preferably primary) aromatically or aliphatically (preferably aliphatically) bound amino groups, wherein amino end groups can also be attached to the polyether chain through urethane or ester groups. These amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317 and U.S. Pat. Nos. 4,723,032 (which corresponds to U.S. application Ser. No. 437,641 (filed Oct. 19, 1982)), 4,855,504 (which corresponds to U.S. application Ser. No. 778,656 (filed Sep. 23, 1985)), 4,724,252 (which corresponds to U.S. application Ser. No. 895,629 (filed Aug. 11, 1986)), 4,931,595 (which corresponds to U.S. application Ser. No. 908,535 (filed Sep. 16, 1986)), and U.S. application Ser. No. 916,923 (filed Oct. 9, 1986) all the disclosures of which are herein incorporated by reference.

The amine terminated polyethers used in the present invention are in many cases mixtures with any of the above-mentioned compounds.

In another embodiment, the polyhydroxyl compound b1) may additionally comprise: i) a dispersion of a polyurea and/or polyhydrazodicarbonamide in a relatively high molecular weight organic compound containing at least two hydroxyl groups, commercially available as PHD polyols from Bayer Corp., ii) a polymer polyol prepared by polymerizing an ethylenically unsaturated monomer or monomers in a relatively high molecular weight organic compound containing at least two hydroxyl groups, or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550,796, 2,550,797, 2,550,833, 2,550,862, 2,633,293, and 2,639,254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Union Carbide.

The preferred PHD polyols include, for example, the polyurea of toluene diisocyanate and hydrazine dispersed in polyether polyol, and the preferred polymer polyols include, for example, those based on the monomers styrene and acrylonitrile.

The isocyanate-reactive component B) additionally comprises component b2) a low molecular weight chain extender. Component b2) is an organic chain extender having a molecular weight of from 61 to 400, preferably from 61 to 192, an average functionality of about 2, and is selected from the group consisting of polyols, primary amines, secondary amines, amino alcohols, and mixtures thereof.

Suitable organic polyols to be used as component b2) according to the invention include, for example, diols and triols having a molecular weight of about 61 to 400, preferably about 61 to 192. These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, neopentyl glycol, cyclohexanedimethanol, and 2,2,4-trimethylpentane-1,3- diol. Preferred diols include, for example, 1,4-butanediol, 1,3-butanediol, and 2-methyl-1,3-propanediol.

Suitable aminoalcohols to be used as component b2) include, for example, those compounds having molecular weights of about 61 to 400, preferably 61 to 192. Some examples of these compounds include monoisopropanolamine, ethanolamine, etc.

Suitable amine compounds to be used as component b2) according to the invention include organic primary amines, secondary amines, and aminoalcohols having molecular weights of about 61 to 400, preferably about 61 to 192. Some examples of these compounds include 2-methyl-1,5-pentane diamine, ethylene diamine, 1,3-diaminopropane, 1,3-diaminobutane, 1,4-diaminobutane, isophoronediamine, diaminocyclohexane, hexamethylenediamine, methyliminobis(propylamine), iminobis(propylamine), bis (aminopropyl)piperazine, aminoethyl piperazine, polyoxyalkylene-amines, bis-(p-aminocyclohexyl)methane, mixtures thereof, and the like.

Other suitable amines include, for example, 1,8-p-diaminomenthane, bis(4-amino-3-methylcyclohexyl) methane, bis(4-amino-3,5-dimethylcyclohexyl)methane, bis (4-amino-2,3,5-trimethylcyclohexyl)methane, 1,1-bis(4-aminocyclohexyl)propane, 2,2-(bis(4-aminocyclohexyl) propane, 1,1-bis(4-aminocyclohexyl)ethane, 1,1-bis(4-aminocyclohexyl)butane, 2,2-bis(4-aminocyclohexyl) butane, 1,1-bis(4-amino-3-methylcyclohexyl)ethane, 2,2-bis (4-amino-3-methylcyclohexyl)propane, 1,1-bis(4-amino-3, 5-dimethylcyclohexyl)ethane, 2,2-bis(4-amino-3,5-dimethylcyclohexyl)propane, 2,2-bis(4-amino-3,5-dimethylcyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

It is also possible to use the so-called amine-terminated polyethers having low molecular weights. Among the suitable amine terminated polyethers include, for example, those containing primary or secondary (preferably primary) aromatically or aliphatically (preferably aliphatically) bound amino groups, wherein amino end groups can also be attached to the polyether chain through urethane or ester groups. Suitable compounds include, for example, Jeffamine D-400 and Jeffamine D-230, which are commercially available from Huntsman Chemical Corporation.

These low molecular weight amine-terminated polyethers can be prepared by any of several methods known in the art. For example, amine-terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, or chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551, 605. French Patent No. 1,466,708 discloses the preparation of polyethers containing secondary amine end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317 and U.S. Pat. Nos. 4,723,032 (which corresponds to U.S. application Ser. No. 437,641 (filed Oct. 19, 1982)), 4,855,504 (which corresponds to U.S. application Ser. No. 778,656 (filed Sep. 23, 1985)), 4,724,252 (which corresponds to U.S. application Ser. No. 895,629 (filed Aug. 11, 1986)), 4,931,595 (which corresponds to U.S. application Ser. No. 908,535 (filed Sep. 16,1986)), and U.S. application Ser. No. 916,923 (filed Oct. 9, 1986) all the disclosures of which are herein incorporated by reference.

The amine terminated polyethers used in the present invention are in many cases mixtures with any of the above-mentioned compounds.

Preferred compounds containing amine groups to be used as component b2) include bis-(4-aminocyclohexyl)-methane, and isophorone diamine.

Other suitable amines to be used for component b2) include, for example, aromatic diamines, having molecular weights of 61 to 400. These aromatic diamines include, for example, 1-methyl-3,5-diethyl-2,4-diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,3'-diethyl-5,5'-diisopropyl-4,4'-diamino diphenylmethane, 1-methyl-2,6-diamino-3-isopropylbenzene and mixtures of the above diamines, such as, for example, mixtures of 1-methyl-3,5-diethyl-2,4-diamino benzene and 1-methyl-3,5-diethyl-2,6-diamino benzene.

In accordance to the present invention, it is also possible that the isocyanate-reactive component B) may include b3) at least one low molecular weight organic monofunctional chain terminator. Suitable compounds to be used as component b3) include organic monofunctional alcohols having a molecular weight of about 32 to 400, preferably about 74 to 150. Examples of such compounds include, for example, methanol, ethanol, 1-propanol, 2-propanol, n-butanol, s-butanol, t-butanol, 2-ethyl-1-hexanol, stearyl alcohol, and alkyl substituted phenols containing from 1 to 22 carbon atoms in the alkyl group such as, for example, nonylphenol.

Suitable amine-group containing components for b3) the monofunctional chain terminator include, for example, cyclohexylamine, propylamine, butylamine, dibutylamine, hexylamine, mixtures thereof, and the like. Preferred compounds to be used as component b3) include n-butanol, 2-ethyl-1-hexanol, cyclohexylamine, and dibutylamine.

It is also possible that the isocyanate-reactive component B) include b4) at least one low molecular weight organic crosslinker. Suitable compounds to be used as component b4) include those organic polyols and organic amines containing greater than 2 isocyanate-reactive groups, preferably 3 to 8, and having a molecular weight of greater than about 90 to less than about 400, preferably about 118 to 192. Examples of such compounds include, for example, diethanolamine, triethanolamine, pentaerythritol, trimethylolpropane, glycerol, diisopropanolamine, diethylenetriamine, aminoethylethanolamine, triethylenetetramine, tetraethylenepentamine, mixtures thereof, and the like. Preferred compounds to be used as component b4) include diethanolamine, triethanolamine, trimethylolpropane, glycerol, and pentaerythritol.

The process of the invention also requires at least one catalyst capable of catalyzing the reaction between the isocyanate groups of A) and the isocyanate-reactive groups of B). It is preferred that the catalyst(s) is optimized both in terms of quantity and chemical composition so as to achieve a 30 s demold time in the process.

In a preferred embodiment, the catalyst comprises c1) at least one catalyst selected from the group consisting of metal carboxylates, metal halides, ammonium carboxylates, and mixtures thereof. Of the metal halides, the metal chlorides are preferred. These catalysts may be used alone or in conjunction with c2) at least one tin-sulfur catalyst, and/or c3) at least one tertiary amine catalyst.

Some examples of catalysts suitable for use as c1) catalysts include metal carboxylates including, for example, tin carboxylates such as, for example, dimethyltin dilaurate, and bismuth carboxylates, such as, for example, bismuth trineodecanoate. Some suitable examples of metal halides include, for example, tin halides and especially tin chlorides such as, for example, dimethyltin dichloride. Suitable examples of ammonium carboxylates include, for example, trimethylhydroxyethylammonium-2-ethylhexanoate (i.e., Dabco TMR). Tin carboxylates such as, for example, dimethyltin dilaurate, and bismuth carboxylates such as, for example, bismuth trineodecanoate are preferred catalysts to be used as component c1). Metal chlorides such as, for example, dimethyltin dichloride are also preferred catalysts to be used as component c1).

Suitable compounds to be used as tin-sulfur catalysts c2) include, for example, dialkyltin dilaurylmercaptides such as, for example, dibutyltin dilaurylmercaptide and dimethyltin dilaurylmercaptide.

Suitable catalysts to be used as tertiary amine catalysts c3) include, for example, triethylamine, triethylenediamine, tributylamine, N-methylmorpholine, N-ethylmorpholine, triethanolamine, triisopropanolamine amine, N-methyldiethanolamine, N-ethyldiethanolamine, and N,N-dimethylethanolamine.

Other additives which may be used in the RIM process according to the present invention include surface-active additives such as emulsifiers and foam stabilizers. Examples include N-stearyl-N',N'-bis(hydroxyethyl)urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described, for example, in U.S. Pat. 2,764,565. In addition to the catalysts and surface-active agents, other additives which may be used in the molding compositions of the present invention include known blowing agents including nitrogen, cell regulators, flame retarding agents, plasticizers, antioxidants, UV stabilizers, adhesion promoters, dyes, fillers and reinforcing agents such as glass in the form of fibers or flakes or carbon fibers. Suitable antioxidants include, for example, Irganox 245, and suitable UV stabilizers include, for example, Tinuvin 765. However, any of the known antioxidants and/or UV stabilizers may be used. As set forth hereinabove, specific advantages have been found in reaction mixtures containing antioxidants and/or UV stabilizers. It is preferred that a stabilizer selected from the group consisting of anti-oxidants, UV-stabilizers, hindered amine light stabilizers, and mixtures thereof is added to the mixture containing isocyanate-reactive components.

It is also possible to use the known internal mold release agents, such as, for example, zinc stearate, in the RIM process of the invention. This IMR is described in U.S. Pat. Nos. 4,269,945 and 4,585,803, the disclosures of which are herein incorporated by reference, and in Canadian Patent 1,180,146.

Pigments may also be added to the B-side of the reaction mixture. Usually when pigments are added, they are dispersed in a hydroxyl group containing compound (such as, for example, a polyether, a polyester, or a chain extender). When this is done, the weight of the hydroxyl group containing compound is considered in determining the percent by weight of components b1), b2), and/or b3) and/or b4) as set forth hereinabove, and in calculating the crosslink density of the resultant composition as set forth hereinabove.

The molded products of the present invention are prepared by reacting the components in a closed mold via the RIM process. The compositions according to the present invention may be molded using conventional processing techniques at isocyanate indexes ranging from about 80 to 115 (preferably from 85 to 115). By the term "Isocyanate Index" (also commonly referred to as NCO index), is defined herein as the equivalents of isocyanate which are reacted with 100 equivalents of isocyanate-reactive hydrogen containing materials.

In general, in a RIM process, two separate streams are intimately mixed and subsequently injected into a suitable mold, although it is possible to use more than two streams. The first stream contains the polyisocyanate component, while the second stream contains the isocyanate reactive components and any other additive which is to be included.

Gaskets can be produced by placing a portion or all of the substrate around which the gasket is to be formed into a mold, injecting a solidifiable composition into a cavity space defined by the outer surface of the edge or edges of the substrate and the internal surface of the mold, and removing the substrate after the solidification of the composition. Gaskets may be produced along one or more edges of various substrates, particularly glass, by any of the methods disclosed in, for example, U.S. Pat. Nos. 4,543,283, 4,561,625, 4,839,122, and 4,755,339, the disclosures of which are herein incorporated by reference. It is, of course, also possible to encapsulate all sides (or the outer circumference) of a substrate with a solidifiable composition.

The invention is further illustrated but is not intended to be limited by the following examples in which all parts and percentages are by weight unless otherwise specified.

EXAMPLES

The following materials were used in the examples.

Isocyanate A:
an isocyanurate group-containing polyisocyanate prepared from 1,6-hexamethylene diisocyanate, and having an isocyanate content of 21.6%, a functionality of 3.5, a content of monomeric diisocyanate of <0.2% and a viscosity at 25° C. of 3000 mPa·s Isocyanate B:
an isocyanurate group-containing polyisocyanate prepared from 1,6-hexamethylene diisocyanate, and having an isocyanate content of 20.4%, a functionality of 3.2, a content of monomeric diisocyanate of <0.2% and a viscosity at 25° C. of 1000 mPa·s Isocyanate C:
a polyisocyanate containing uretdione groups, based on 1,6-hexamethylene diisocyanate, having a viscosity of about 500 mPa·s at 25° C., an NCO content of about 21.8%, a functionality of 2.5, and a free monomer content less than 0.5% by weight Isocyanate D
a polyisocyanate containing allophanate groups, prepared from 1,6-hexamethylene diisocyanate and n-butanol (6 parts alcohol per 100 parts HDI), having a viscosity of about 410 mPa·s at 25° C., an NCO content of about 18.4%, a functionality of about 2.4, and a free monomer content of about 0.32% by weight Isocyanate E:
a polyisocyanate containing allophanate groups, prepared from 1,6-hexamethylene diisocyanate (6 parts alcohol per 100 parts HDI), having a viscosity of about 192 mPa·s at 25° C., an NCO content of about 19%, a functionality of about 2.2, and a free monomer content of about 0.45% by weight Isocyanate F:
a biuret group-containing polyisocyanate prepared from 1,6-hexamethylene diisocyanate and having an isocyanate content of about 23.1% by weight, a functionality of about 3.2, a content of monomeric diisocyanate less than about <0.5% and a viscosity at 25° C. of 1300–2200 mPa·s Isocyanate G:
an isocyanurate group-containing polyisocyanate prepared from bis(4-isocyanatocyclohexyl)methane, and having an isocyanate content of about 25.7%, a functionality of 2.2, a content of monomeric diisocyanate of about 65% and a viscosity at 25° C. of 2850 mPa·s Isocyanate H:
a cycloaliphatic diisocyanate consisting of isomers of bis(4-isocyanatocyclohexyl)methane, and having an isocyanate group content of about 32.6% and a functionality of 2

Isocyanate I:
a 1,6-hexamethylene diisocyanate having an isocyanate group content of about 19.4% and a functionality of about 2.3; prepared from a mixture of Isocyanate F and the diurethane formed by reacting 1,3-butanediol and HDI, in a 1:1 ratio of iso F:diurethane Isocyanate J:
a cycloaliphatic diisocyanate consisting of isomers of bis(4-isocyanatocyclohexyl)methane, and having an isocyanate group content of about 25.7% and a functionality of 2; prepared from the diurethane of bis(4-isocyanatocyclohexyl)methane and 1,3-butanediol Polyol A:
  a propylene glycol started propylene oxide/ethylene oxide polyether (80 wt. % PO, 20 wt. % EO), and having an OH number of about 28 and a functionality of 2

Polyol B:
  a glycerin started propylene oxide/ethylene oxide polyether (82.5 wt. % PO, 17.5 wt. % EO), and having an OH number of about 28 and a functionality of 3

Polyol C:
  a glycerin started propylene oxide/ethylene oxide polyether (83 wt. % PO, 17 wt. % EO), and having an OH number of about 35 and a functionality of 3

Polyol D:
  a difunctional polyester prepared from adipic acid and neopentyl glycol, and having an OH number of about 112 and a viscosity of about 8000 cps Polyol E:
  a trifunctional, 1000 equivalent weight amine-terminated polypropylene glycol, commercially available from Huntsman Chemical Corp. as Jeffamine® T-3000

Polyol F:
  a difunctional, 200 equivalent weight amine-terminated polypropylene glycol, commercially available from Huntsman Chemical Corp. as Jeffamine® D-400

MP Diol: 2-methyl-1,3-propanediol
MEOA: monoethanolamine
DEOA: diethanolamine
TEOA: triethanolamine
IPDA: isophoronediamine
TMP: trimethylolpropane
Irganox 245: an antioxidant, commercially available from Ciba-Geigy Inc.
Tinuvin 765: a UV stabilizer, commercially available from Ciba-Geigy Inc.
Pigment A: a blend of carbon black (15 wt. %) in 2-methylpropane-1,3-diol (85 wt. %)
Pigment B: a blend of carbon black (9 wt. %) in an EO-tipped poly(propylene oxide) having an equivalent weight of 2400 and an OH number of about 23
Pigment C: a blend of carbon black (17 wt. %) in a difunctional polyester; the dispersion has an overall OH number of about 50; commercially available from Plasticolors as DG-20341
Catalyst A: Fomrez UL-28, dimethyltin dilaurate, commercially available from Witco Corp.
Catalyst B: Coscat 83, bismuth trineodecanoate, commercially available from Cosan Chemical Company
Catalyst C: DABCO® T-12, dibutyltin dilaurate catalyst, commercially available from Air Products and Chemicals, Inc. Catalyst D: DABCO® 33LV, 33% triethylene diamine in dipropylene glycol, commercially available from Air Products and Chemicals, Inc.

The formulations in Tables 1–3 have actually been molded in commercial window gasket molds. Plaque samples of the formulations in Tables 1–5 were molded and tested for squeak.

The apparatus illustrated in FIG. 1 was used to test the squeak intensity of the molded plaques and the window gaskets produced using the formulations set forth in the examples below.

FIG. 1 illustrates the equipment set up of an acoustic box 1, with a servohydraulic testing instrument 9 and an acoustic mixing board 25.

The acoustic box 1 is constructed of outside walls having dimensions slightly larger than the dimensions of the inside walls, thereby forming a cavity between the inside and outside walls. It is preferred that the dimensions of the outside walls are approximately 24 in.×16 in.×22 in., and the dimensions of the inside walls are approximately 20 in.×12 in.×18 in. The outside walls are constructed of metal, and the inside walls are constructed of perforated metal. It is preferred that the outside walls are constructed of 16 gauge sheet metal, and the inside walls are constructed of 22 gauge perforated sheet metal. The cavity between the inside and outside walls of the acoustic box 1 is filled with a sound deadening material. It is preferred that this sound deadening material is Sonex sound deadening material, which is a 4.5 pcf mineral wool wrapped with 1.5 mil polyurethane.

The acoustic box 1 is constructed with a door on one side to allow access to the inside of the box. This door is constructed similarly to the acoustic box 1 as described above. One side of the door is hinged, and the other side of the door closes by means of a latching mechanism, preferably a magnetic latching mechanism.

As illustrated in FIG. 1, mounted to the inside floor of the acoustic box 1 is a vise 2 having a stationary jaw 2a and a movable jaw 2b with a manual screw 3 for moving jaw 2b. A surface 4, which is preferably a flat panel of painted sheet metal, is held in place between stationary jaw 2a and movable jaw 2b of the vise 2 by completely tightening manual screw 3.

Figure 4:
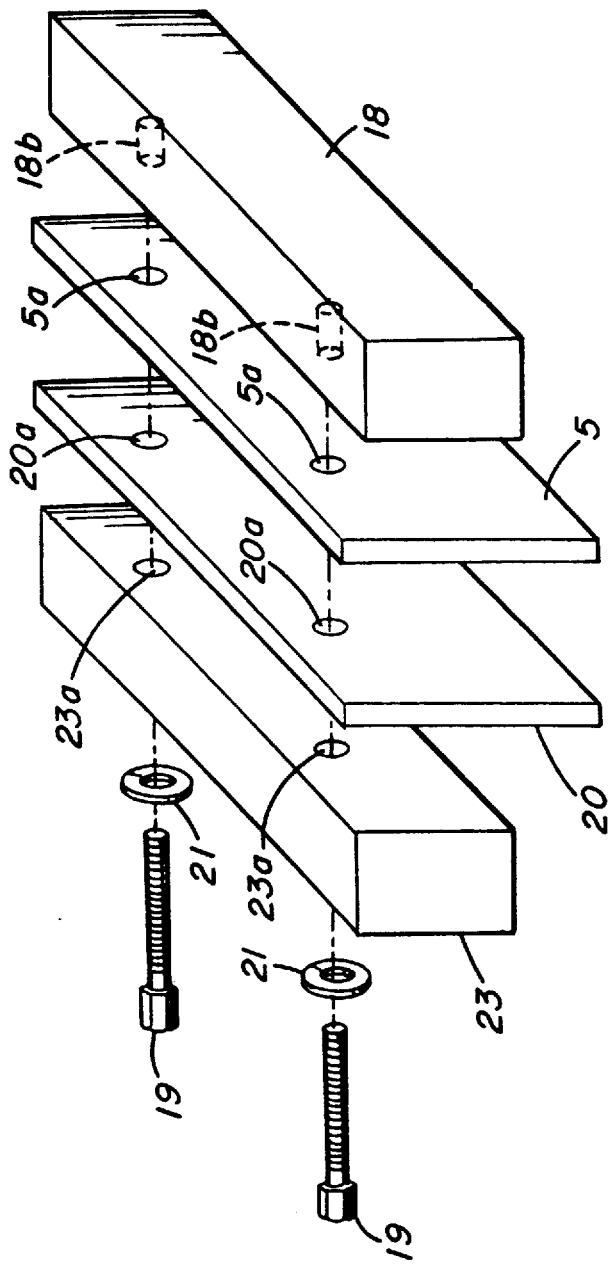
FIG. 4 is a perspective view of a molded plaque with a support bar on one side and a backing plate and another support bar on the other side.
Figure 5:
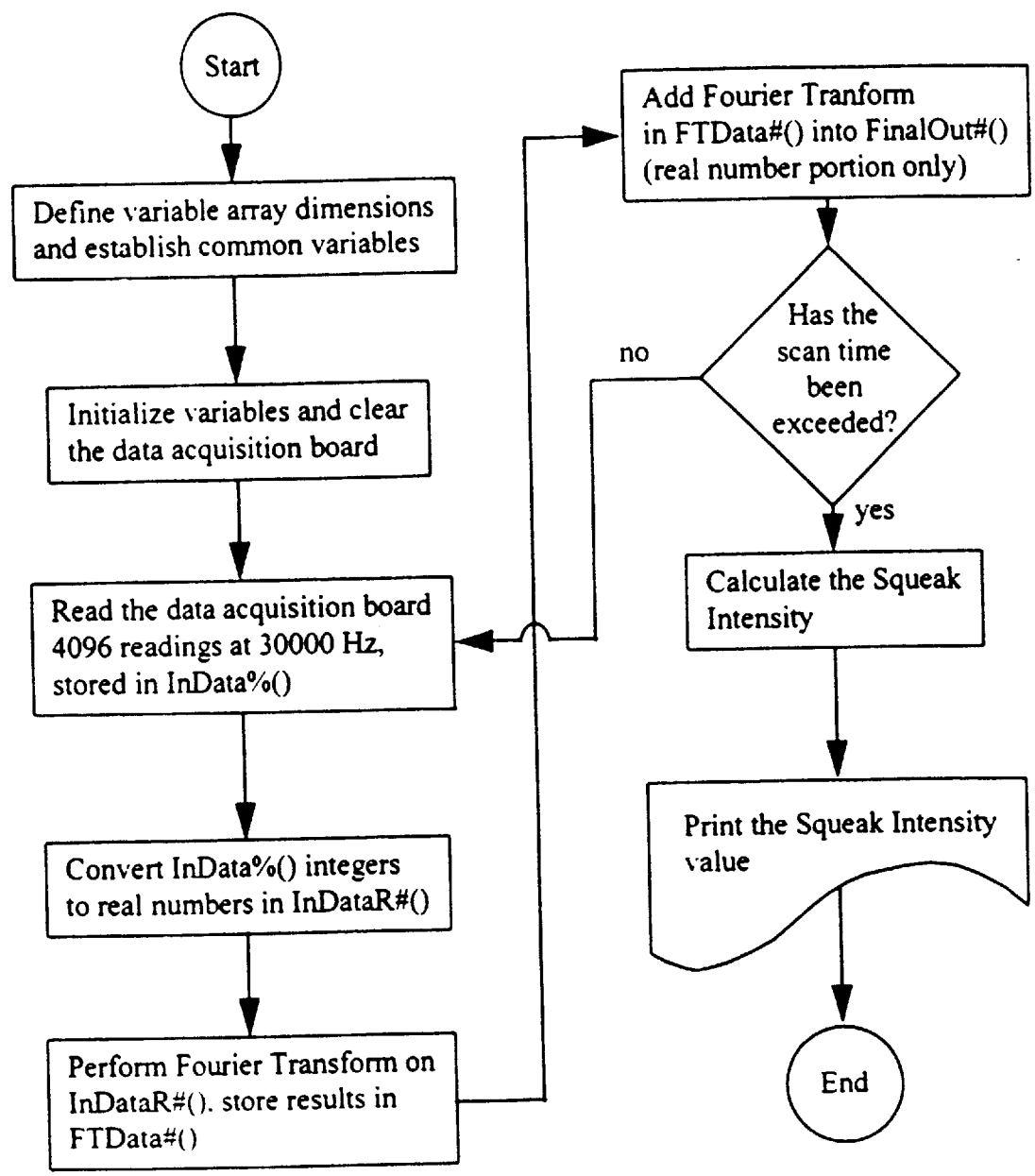
FIG. 5 is a flowchart for the Squeak Testing computer software program which is used to determine Squeak Intensity Data.

Another manual screw 6 is attached to the lower side of vise 2. The tightening of manual screw 6 brings surface 4 into contact with the test material 5. This test material 5 is a molded article composed of gasket material to be tested for squeak intensity. Test material 5 may be present in the form of a molded plaque 5 as seen in FIG. 4. Test material 5 is held by a mounting device 13 which connects to the actuator arm 7 as described hereinbelow.

Figure 2:
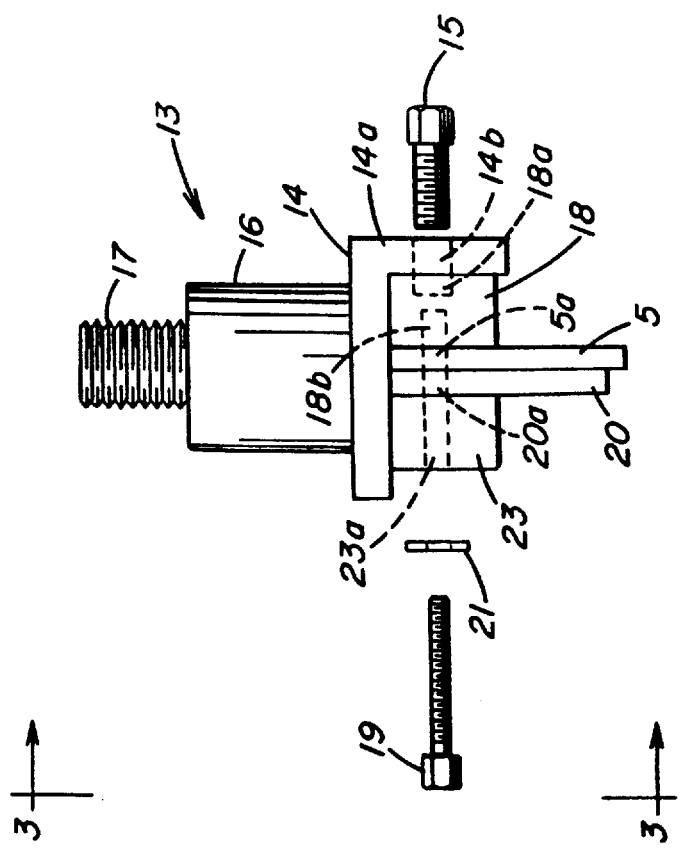
FIG. 2 is an enlarged view of a mounted molded plaque (item 13) as seen in FIG. 1.

An enlarged view of the mounting device 13 is illustrated in FIG. 2. Test material 5 is mounted with mounting device 13 consisting of a base 14 wherein the front face 14a of base 14 extends downward and has two openings 14b which are each capable of receiving screws 15 (or another connector means).

A rectangular shaped support bar 18 is located directly behind the front face 14a of base 14. Support bar 18 has two openings 18a located such that openings 18a are directly in line with openings 14b of the front face 14a of base 14. Support bar 18 extends horizontally beyond the ends of front face 14a of the base 14. Another set of openings 18b is located on the portion of support bar 18 which extends vertically beyond the ends of front face 14a. Screws 15 attach support bar 18 to the inside of front face 14a of base 14 through openings 18a and 14b.

As seen in the perspective view illustrated in FIG. 4, the RIM molded plaque 5 is located in front of a backing plate 20 such that the back of plaque 5 lays in contact with backing plate 20. The plaque 5 has two openings 5a in the upper corners, and backing plate 20 has two openings 20a in the upper corners. Openings 20a are located such that they are directly behind openings 5a. The size of backing plate 20 is substantially the same as plaque 5, except that the lower edge of plaque 5 extends slightly beyond the lower edge of backing plate 20. The backing plate 20 is optional, but preferred. A second rectangular shaped support bar 23 is placed directly behind backing plate 20 (or if not present, directly behind the plaque 5). Support bar 23 also has two openings 23a located such that they are directly behind openings 20a (if backing plate is present) and openings 5a. Two screws 19 and two lock washers 21 are inserted through openings 23a, 20a (if backing plate is present), 5a, and 18b, and tightened, thereby attaching the support bar 23, backing plate 20 (if present) and molded plaque 5 to support bar 18 and indirectly to the front face 14a of base 14 of mounting device 13 (as illustrated in FIG. 2).

As further illustrated in FIG. 2, an arm 16 extends upward from the top of base 14. The uppermost portion of arm 16 is shaped to form a threaded screw 17. Threaded screw 17 is threaded into a cavity 7a (see FIG. 1) located at the bottom of the actuator arm 7 as illustrated in FIG. 1 inside acoustic box 1. Cavity 7a is reversely threaded to receive threaded screw 17 of mounting device 13.

Figure 3:
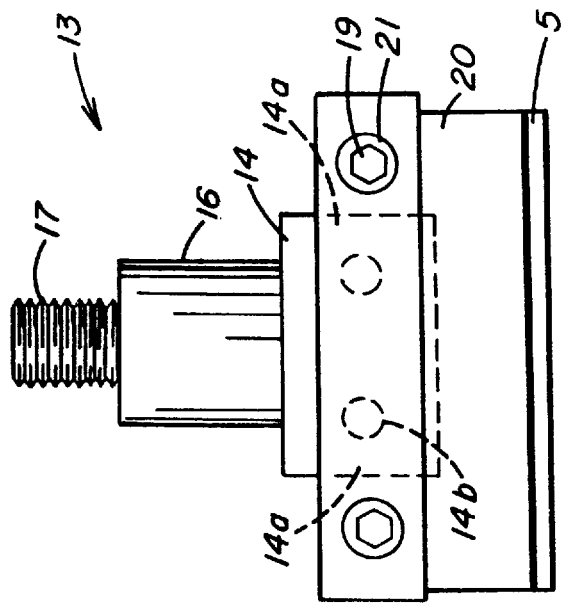
FIG. 3 is a view of the device in FIG. 2 in the direction of the plane 3—3.

FIG. 3 is a view of the mounting device shown in FIG. 2 in the direction of plane 3—3. This view shows the base 14 wherein the front face 14a extends downward. There are two openings 14b which are each capable of receiving a screw 15 to connect support bar 18 (not shown in FIG. 3) to the front face 14a of the base 14.

Support bar 23 is connected by screws 19 and lock washers 21 to backing plate 20, test material 5, and support bar 18 (not shown) through openings (not shown) 23a, 20a, 5a, and 18b.

Arm 16 extends upward from the top of base 14 which the uppermost portion shaped to form a threaded screw 17. Threaded screw 17 is threaded into cavity 7a located at the bottom of the actuator arm 7 as illustrated in FIG. 1.

The actuator arm 7 enters the top of acoustic box 1 through an opening 8 (preferably about 3.5 inches in diameter) located in the top of acoustic box 1. The actuator arm 7 extends beyond opening 8 of acoustic box 1 and connects to the servohydraulic testing instrument 9. The working examples specifically used a servohydraulic testing instrument produced by Instron Corporation, Model No. 8502. The servohydraulic testing instrument 9 is programmed with a sine wave program to sinusoidally move actuator arm 7, thus causing mounted test material 5 to move in a sinuous motion against surface 4. The amplitude and frequency are programmable in the specific sine wave program used herein.

Any noise or sound emitted from the motion of test material 5 against surface 4 enters a microphone 10 (Model No. D-112 manufactured by AKG was used in the examples of the present application) that is mounted on a low impedance cable 11 which enters through the top of the acoustic box 1 through a second opening 12 (about 1.75 inches in diameter). The second opening 12 is spaced slightly away from opening 8 such that microphone 10 is located several inches (preferably about 3 inches) away from the mounted test material 5 on the bottom of actuator arm 7. Sound deadening material (not shown) is placed in openings 8 and 12 around the low impedance cable 11 and Instron actuator arm 7 to prevent outside noise from infiltrating the interior of the acoustic box 1 through these openings. It is preferred to use flexible polyurethane foam.

The low impedance cable 11 is connected to an acoustic mixing board 25 located outside the acoustic box 1. The specific mixing board 25 used in the examples was a Model No. 6100RA, manufactured by TAPCO. The master gain of the mixing board 25 was set on 5, and the gain on the channel receiving the signal from the microphone was also set on 5.

Any noise picked up by the microphone 10 inside acoustic box 1 is transmitted (in volts) to the acoustic mixing board 25, and the output from the mixing board 25 is then fed into an analog-to-digital converter (not shown). The analog-to-digital converter (also referred to as a data acquisition board) used herein was manufactured by National Instruments. The digital signal leaving the analog-to-digital converter is sent to an IBM compatible 486 computer (not shown) having software (see Squeak Testing Program below) which collects the noise data for 60' seconds, calculates the power spectrum and integrates the total power intensity of the signal. This software filters out low frequency noise below 100 Hz via a digital Butterworth filter. The data from the computer formed the basis for the squeak intensity information set forth in the tables of the examples of the present application.

Samples were flat polyurethane panels (having dimensions of 110 mm long, 38 mm wide, and 2 to 4 mm thick) prepared by the Reaction Injection Molding process were treated in the following manner prior to mounting in the apparatus described above. Samples were initially cleaned with warm water and mild detergent to remove external mold release. Immediately prior to testing, the samples were wiped with 70:30 isopropanol:water, wiped dry, then wiped with water and wiped dry. The painted sheet metal surface was cleaned by an identical process before each measurement.

After preparing both surfaces, the panel of gasket material was attached to the testing instrument described hereinabove, and the sine wave program was initiated. The gasket material was vibrated at 5 Hz with an amplitude of 1 mm using the apparatus described above. The vise holding the sample of painted sheet metal (i.e., the rigid surface 4) was adjusted to provide contact between the panel of gasket material and the painted sheet metal surface. Contact pressure was adjusted to produce the maximum noise from the sample. The position of the vise was then locked, and the apparatus was allowed to run for five minutes. After the five minute induction period, noise data was recorded inside the acoustic box for 60 seconds. The squeak intensity was calculated by the software (see Squeak Testing Program below) by integrating the power spectrum. Thus, the squeak intensity data reported in the tables of the examples represents the voltage measured by the microphone, integrated over the 60 second collection time, after the low frequency background noise was electronically removed.

Concurrently, the operator performing the squeak intensity test was listening to the noise generated through headphones (not shown) which were attached to the acoustic mixing board 25. The Otic rating was assigned based on the operator's observations during the data collection for the squeak intensity. An Otic rating for each sample was assigned by the operator to the noise heard during this data collection period. The Otic (i.e., of the ear) rating is a subjective ranking of the squeak noise intensity with the noise being ranked on a scale of between 0 and 3 wherein:

| | |
|---|---|
| 0 | represents no noise |
| 0.5 | represents a faint, intermittent noise |
| 1 | represents a faint, barely audible sound |
| 1.5 | represents an intermittent, moderate squeak |
| 2 | represents a moderate squeak |
| 2.5 | represents a very loud, intermittent squeak |
| 3 | represents a very loud squeak. |

The formulations set forth in Tables 1A, 2A and 3A below were used to produce a window gasket on a production type tool designed to encapsulate a sheet of glass measuring 5.5'×3.5', unless otherwise specified. The sheet of glass was place inside the mold, the mold was closed, and filled with 600 g of material so as to form a gasket on 3 sides of the sheet of glass.

A B-side mixture was prepared by blending the specified parts by weight (pbw) of polyol, chain extenders, crosslinkers, pigments, Irganox 245, Tinuvin 765 and catalyst together and thoroughly mixed. They were put into the B-side of a Hennecke RIMDOMAT RIM machine. An appropriate quantity of specified isocyanate was loaded into the A-side. The RIMDOMAT was equipped with a Hennecke mq8 Mixhead. The B-side was preheated to the specified temperature (° C.) and the A-side was heated to the specified temperature (° C.). The mold was heated to the specified temperature and sprayed with ChemTrend RCTW 2006, a soap-based external mold release. The materials used to produce plaques were injected at the appropriate ratio to achieve a 105 isocyanate index with an injection pressure of 200 bar and an injection rate of 200 grams/sec. The material was injected into a flat plaque mold of 3×200× 300 mm. After a 30 s dwell time, the part was demolded. Physical properties were determined in accordance with ASTM standards. Otic ratings and squeak intensity tests were performed on all test plaques prepared by the process and under the conditions described above. Other RIM examples were performed in an identical manner, except for the pbw of various components.

| | |
|---|---|
| D790 | flexural modulus |
| D412 | tensile strength; and elongation |
| D624 | die C tear strength |

TABLE 1A

Formulations molded as window gaskets and plaques

| Example: | 1a | 1b | 1c |
|---|---|---|---|
| Polyol A | 67 | 76.5 | 69.5 |
| MP Diol | 10.2 | 3.2 | 10.2 |
| MEOA | 5 | 2.5 | 2.5 |
| n-Butanol | 3.8 | 3.8 | 3.8 |
| Pigment A | 8 | 8 | 8 |
| Irganox 245 | 1 | 1 | 1 |
| Tinuvin 765 | 3 | 3 | 3 |
| Catalyst A | | 2 | 2 |
| Catalyst B | 2 | | |
| Polyol Density[a] (g/ml) | 0.94 | 0.96 | 0.96 |
| Isocyanate: | A | A | A |
| Crosslink Density (moles/kg) | 1.00 | 0.69 | 0.91 |

[a]density measured under 3 bar of pressure

TABLE 1B

Processing Parameters (measured on molded window gaskets)

| Example: | 1a | 1b | 1c |
|---|---|---|---|
| Iso. Temp. (°C.) | 53 | 55 | 58 |
| Polyol Temp. (°C.) | 33 | 35 | 38 |
| Mold Temp. (°C.) | 65 | 65 | 65 |
| Pressure (bar) | 195 | 160 | 180 |
| Volume Ratio | 1.08 | 0.77 | 1.06 |
| Shot time (sec.) | 2.2 | 1.1 | 1.25 |

TABLE 1C

Physical Properties (measured on plaques)

| Example: | 1a | 1b | 1c |
|---|---|---|---|
| Crosslink Density | 1.00 | 0.69 | 0.91 |

TABLE 1C-continued

Physical Properties (measured on plaques)

| Example: | 1a | 1b | 1c |
|---|---|---|---|
| Otic Rating | 1 | 0 | 0 |
| Squeak intensity | 1860 | 1070 | 1630 |
| Flexural Modulus, perp. (psi) | 12,600 | 1,600 | 7,000 |
| Flexural Modulus, para. (psi) | 12,200 | 1,300 | 5,400 |
| Tear Strength, Die C, perp. (pli) | 220 | 30 | 90 |
| Tear Strength, Die C, para. (pli) | 230 | 30 | 80 |
| Elongation, perp. (%) | 70 | 80 | 70 |
| Elongation, para. (%) | 70 | 80 | 60 |
| Tensile Strength, perp. (psi) | 1900 | 740 | 2050 |
| Tensile Strength, para. (psi) | 1900 | 760 | 1650 |
| Hardness Shore A | 96 | 75 | 92 |
| Density | 70.4 | 69.3 | 69.7 |

TABLE 2A

Formulations molded as window gaskets and plaques

| | Example | | | | |
|---|---|---|---|---|---|
| | 2a[b] | 2b | 2c | 2d[b] | 2e[c] |
| Polyol B | 70.8 | 78.8 | 67.8 | 68.8 | 65.8 |
| MP Diol | 10.2 | 3.2 | 14.2 | 12.2 | 14.2 |
| MEOA | 4 | 4 | 4 | 5 | 6 |
| Tinuvin 765 | 3 | 3 | 3 | 3 | 3 |
| Irganox 245 | 1 | 1 | 1 | 1 | |
| Pigment A | 8 | 8 | 8 | 8 | 8 |
| Catalyst A | 2 | 2 | 2 | 2 | 2 |
| Polyol[a] density (g/ml) | | | 0.98 | 0.98 | |
| Isocyanate | B | B | B | B | B |
| Crosslink Density (moles/kg) | 0.98 | 0.86 | 1.04 | 1.03 | 1.08 |

[a]density measured under 3 bar of pressure
[b]molded around a piece of glass 6' × 4' using 600 g of material
[c]molded around a piece of glass 3' × 1.5' using 830 g of material

TABLE 2B

Processing Parameters (measured on molded window gaskets)

| | Example | | | | |
|---|---|---|---|---|---|
| | 2a | 2b | 2c | 2d | 2e |
| Iso. Temp. (°C.) | 41 | 43 | 41 | 42 | 47 |
| Polyol Temp. (°C.) | 38 | 41 | 33 | 35 | 38 |
| Mold Temp. (°C.) | 70 | 68 | 70 | 70 | 75 |
| Pressure (bar) | 195 | 185 | 195 | 195 | 220 |
| Volume Ratio | 1.03 | 0.77 | 1.25 | 1.14 | 1.23 |
| Shot time (sec.) | 3.6 | 0.45 | 1.65 | 3.2 | 3.7 |

TABLE 2C

Physical Properties (measured on plaques)

| | Example | | | | |
|---|---|---|---|---|---|
| | 2a | 2b | 2c | 2d | 2e |
| Crosslink Density | 0.98 | 0.86 | 1.04 | 1.03 | 1.08 |
| Otic Rating | 0 | 0.5 | 1.0 | 0 | 0 |
| Squeak intensity | 1400 | 3600 | 4000 | 200 | 200 |
| Flex. Mod. perp. (psi) | 4793 | 2185 | 13,980 | 17,860 | 18,090 |
| Flex. Mod. para. (psi) | 6937 | 2209 | 17,660 | 24,020 | 57,540 |
| Die C Tear perp. (pli) | 89 | 66 | 207 | 338 | 338 |
| Die C Tear para. (pli) | 102 | 66 | 243 | 347 | 432 |
| Elong., perp. (%) | 61 | 61 | 59 | 96 | 95 |
| Elong., para. (%) | 59 | 74 | 64 | 83 | 92 |
| Tensile. Str. perp. (psi) | 1493 | 750 | 1839 | 2271 | 2562 |
| Tensile Str. para. (psi) | 1554 | 954 | 1907 | 1937 | 2566 |
| Shore A Hardness | 69.2 | 69 | 69.5 | 96 | 95 |
| Density | 89 | 79 | 93 | 69 | 69 |

TABLE 3A

Formulations molded as window gaskets and plaques

| Example: | 3a | 3b | 3c |
|---|---|---|---|
| Polyol B | 66.8 | 63.8 | 62.8 |
| MP Diol | 9.2 | 9.2 | 10.2 |
| IPDA | 6 | 8 | 10 |
| TMP | 4 | 5 | 3 |
| Pigment A | 8 | 8 | 8 |
| Irganox 245 | 1 | 1 | |
| Tinuvin 765 | 3 | 3 | 3 |
| Catalyst A | 2 | 2 | 2 |
| Polyol Density[a] (g/ml) | 0.97 | 0.98 | 0.98 |
| Isocyanate: | C | C | C |
| Crosslink Density (moles/kg) | 0.74 | 0.78 | 0.72 |

[a]density measured under 3 bar of pressure

TABLE 3B

Processing Parameters (measured on molded window gaskets)

| Example: | 3a | 3b | 3c |
|---|---|---|---|
| Iso. Temp. (°C.) | 31 | 40 | 32 |
| Polyol Temp. (°C.) | 39 | 38 | 34 |
| Mold Temp. (°C.) | 80 | 70 | 70 |
| Pressure (bar) | 180 | 185 | 200 |
| Volume Ratio | 1.01 | 1.10 | 1.09 |
| Shot time (sec.) | 1.55 | 1.3 | 1.4 |

TABLE 3C

Physical Properties (measured on plaques)

| Example: | 3a | 3b | 3c |
|---|---|---|---|
| Crosslink Density | 0.74 | 0.78 | 0.72 |
| Otic Rating | 0 | 0 | 0 |
| Squeak intensity | 630 | 560 | 670 |
| Flex. Mod., perp. (psi) | 2,537 | 3,592 | 4,406 |
| Flex. Mod., para. (psi) | 2,410 | 4,045 | 5,269 |
| Die C Tear, perp. (pli) | 82 | 74 | 90 |
| Die C Tear, para. (pli) | 109 | 131 | 144 |
| Elong., perp. (%) | 138 | 138 | 130 |
| Elong., para. (%) | 123 | 140 | 140 |
| Tensile Str., perp. (psi) | 1308 | 1729 | 1818 |
| Tensile Str., para. (psi) | 1295 | 2030 | 2249 |
| Shore A Hardness | 85 | 89 | 91 |
| Density | 69.1 | 69.0 | 69.2 |

The formulations set forth in Tables 4A and 5A below were used to prepare plaques via the following RIM process.

A B-side mixture was prepared by blending the specified parts by weight (pbw) of polyol, chain extenders, crosslinkers, pigments, Irganox 245, Tinuvin 765 and catalyst together and thoroughly mixed. They were put into the B-side of a Hennecke RIMDOMAT RIM machine. An appropriate quantity of the specified isocyanate was loaded into the A-side. The RIMDOMAT was equipped with a Hennecke mq8 Mixhead. The B-side was preheated to the specified temperature (° C.) and the A-side was heated to the specified temperature (OC). The materials used to produce plaques were injected at the appropriate ratio to achieve a 105 isocyanate index with an injection pressure of 200 bar and an injection rate of 200 grams/sec. The material was injected into a flat plaque mold of 3×200×300 mm, and sprayed with ChemTrend RCTW 2006 external mold release spray. After a 30 s dwell time, the part was demolded. Physical properties were determined in accordance with ASTM standards. Other RIM examples were performed in an identical manner, except for the pbw of various components.

ASTM methods used for these examples were the same as those in Examples 1–3 above.

TABLE 4A

Formulations molded as plaques

| Example | 4a | 4b | 4c | 4d |
|---|---|---|---|---|
| Polyol B | 62.1 | 60.8 | 69.8 | 67 |
| Polyol C | | | | |
| Polyol A | | | | |
| Polyol F | | | | |
| IPDA | 9 | 9 | 6 | |
| MP Diol | 10.2 | 10.2 | 10.2 | 4.4 |
| MEOA | | | | 7.9 |
| DEOA | 4.7 | | | |
| TEOA | | | | 6.7 |
| TMP | | 6 | | |
| Tinuvin 765 | 3 | 3 | 3 | 3 |
| Irganox 245 | 1 | 1 | 1 | 1 |
| Pig. A | 8 | 8 | 8 | 8 |

TABLE 4A-continued

Formulations molded as plaques

| | | | | |
|---|---|---|---|---|
| Pig. B | | | | |
| Cat. A | 2 | 2 | 2 | 2 |
| ISO | D | D | D | E |
| Cross. Dens. (moles/kg) | 0.66 | 0.66 | 0.45 | 0.47 |

| Example | 4e | 4f | 4g | 4h | 4i |
|---|---|---|---|---|---|
| Polyol B | 60.1 | | | | |
| Polyol C | | | 72.5 | 72.5 | |
| Polyol A | | 65 | | | |
| Polyol E | | | | | 52.8 |
| Polyol F | | | 13 | 13 | 13 |
| IPDA | 9 | | | | |
| MP Diol | 10.2 | 23 | 10 | 10 | 4.2 |
| MEOA | | 3 | | | |
| DEOA | | | | | |
| TEOA | 6.7 | | | | |
| TMP | | | 2.5 | | 10 |
| Tinuvin 765 | 3 | 3 | | | 3 |
| Irganox 245 | 1 | 1 | | | 1 |
| Pig. A | 8 | | | | |
| Pig. B | | 3 | | | 14 |
| Cat. A | 2 | 2 | 2 | 2 | 2 |
| ISO | E | F | G | G | H |
| Cross. Dens. (moles/kg) | 0.47 | 1.14 | 0.42 | 0.3 | 0.59 |

TABLE 4B

Processing Parameters

| Example | 4a | 4b | 4c | 4d |
|---|---|---|---|---|
| Iso. Temp. (°C.) | 46 | 46 | 50 | 46 |
| Polyol Temp. (°C.) | 46 | 46 | 50 | 46 |
| Mold Temp. (°C.) | 80 | 80 | 85 | 80 |
| Vol. Ratio | 155 | 155 | 116 | 157 |

| Example | 4e | 4f | 4g | 4h | 4i |
|---|---|---|---|---|---|
| Iso. Temp. (°C.) | 46 | 55 | 55 | 55 | 50 |
| Polyol Temp. (°C.) | 46 | 45 | 40 | 40 | 50 |
| Mold Temp. (°C.) | 80 | 68 | 85 | 85 | 90 |
| Vol. Ratio | 150 | 122 | 67 | 57 | 56 |

TABLE 4C

| | Example | | | | | | | | |
|---|---|---|---|---|---|---|---|---|---|
| | 4a | 4b | 4c | 4d | 4e | 4f | 4g | 4h | 4i |
| Crosslink Density | 0.66 | 0.66 | 0.45 | 0.47 | 0.47 | 1.14 | 0.42 | 0.3 | 0.59 |
| Otic Rating | 0 | 0 | 0 | 0.5 | 0 | 0 | 1 | 0.5 | 1 |
| Squeak Intensity | 822 | 411 | 1191 | 1377 | 486 | 319 | 1981 | 2097 | 3084 |

TABLE 4D

Physical Properties

| | Example | | | | |
|---|---|---|---|---|---|
| | 4d | 4e | 4g | 4h | 4i |
| Flex. Mod., perp. (psi) | | 2700 | 11,500 | 4400 | 56,200 |
| Flex. Mod., para. (psi) | 1300 | 5300 | 10,300 | 4100 | 51,600 |
| Die C Tear, perp. (pli) | | 180 | 53 | 37 | 460 |
| Die C Tear, para. (pli) | 125 | 230 | 55 | 36 | 430 |
| Elong., perp. (%) | | 170 | 125 | 138 | 103 |
| Elong., para. (%) | 380 | 170 | 110 | 125 | 118 |
| Tens. Str., perp. (psi) | | 1600 | 1500 | 1900 | 2800 |
| Tens. Str., para. (psi) | 1050 | 1900 | 1500 | 1800 | 3100 |
| Shore A Hardness | | | 92 | 85 | 98 |
| Shore D Hardness | 21 | 30 | | | 58 |
| Density | 68.9 | 68.5 | 67.3 | 67.2 | 66.7 |

TABLE 5A

Formulations molded as plaques

| | Example | | | | |
|---|---|---|---|---|---|
| | 5a | 5b | 5c | 5d | 5e |
| Polyol C | | | | 67.5 | |
| Polyol E | 67 | 66.5 | 88 | | 75 |
| Polyol F | 13 | 13 | | | 13 |
| MP Diol | 10 | 10 | | 21 | 10 |
| MEOA | 2 | | 10 | 4 | |
| TMP | | 2.5 | | | |
| Tinuvin 765 | 3 | 3 | | 3 | |
| Irganox 245 | 1 | 1 | | 1 | |
| Pigment C | 2 | 2 | | 1.5 | |
| Catalyst A | 2 | 2 | 2 | | 2 |
| Catalyst C | | | | 1.5 | |
| Catalyst D | | | | 2 | |
| ISO | H | H | H | I | J |
| Crosslink Density moles/kg | 0.14 | 0.26 | 0.19 | 0.18 | 0.15 |

TABLE 5B

Processing Parameters:

| Example | 5a | 5b | 5c | 5d | 5e |
|---|---|---|---|---|---|
| Iso. Temp. (°C.) | 40 | 40 | 40 | 55 | 55 |

TABLE 5B-continued

Processing Parameters:

| Example | 5a | 5b | 5c | 5d | 5e |
|---|---|---|---|---|---|
| Polyol Temp. (°C.) | 45 | 45 | 40 | 45 | 40 |
| Mold Temp. (°C.) | 90 | 90 | 75 | 80 | 80 |
| Volume Ratio | 57 | 56 | 57 | 146 | 63 |

TABLE 5C

Physical Properties

| | \multicolumn{5}{c}{Example} |
|---|---|---|---|---|---|
| | 5a | 5b | 5c | 5d | 5e |
| Cross-link Density | 0.14 | 0.26 | 0.19 | 0.18 | 0.15 |
| Otic Rating | 3 | 2.5 | 3 | 2 | 3 |
| Squeak intensity | 94,718 | 21,424 | 279,714 | 63,291 | 271,660 |
| Flex. Mol. para. (psi) | 15,000 | 5000 | 22,000 | 4800 | 5000 |
| Flex. Mod. para. (psi) | 23,000 | 10,500 | 23,000 | 10,600 | 5200 |
| Die C Tear perp. (pli) | 380 | 230 | 440 | 230 | 150 |
| Die C Tear para. (pli) | 490 | 220 | 440 | 220 | 160 |
| Elong., perp. (%) | 210 | 210 | 285 | 210 | 295 |
| Elong., para. (%) | 270 | 190 | 280 | 190 | 280 |
| Tensile Str. perp. (psi) | 2900 | 1800 | 4000 | 1800 | 2400 |
| Tensile Str. para. (psi) | 3500 | 1600 | 3900 | 1600 | 2100 |
| Shore A Hardness | | | 96 | | 93 |
| Density (lb/ft$^3$) | | | 64.7 | | 66.6 |

The IBM compatible 486 computer was running the following software program as a QuickBASIC 4.5 program using LabWindows 2.2.

This program was used to yield the Squeak Intensity Data presented in the Tables. This program was written by John L. Clemons, an employee of Bayer Corporation.

```
Squeak Testing Program

REM define array for retrieving integer data off the data acquisition board
DIM Indata %(4096)
common shared/indata/Indata %()
REM define array that redefines data as real numbers
DIM IndataR#(4096)
common shared /indataR/indataR#()
REM define array that holds data from one scan after Fourier Transform
DIM FTData#(4096)
common shared /FTData/FTData#()
REM define array that accumulates all scans Fourier Transform noise
REM data after dropping imaginary component from complex conjugate
DIM FinalOut#(2048)
common shared /FinalOut/FinalOut#()
DIM totalpowers as string*16
common shared /Number/Number %
common shared /SampleRate/SampleRate#
common shared /ScanTime1/ScanTime1#
common shared /Power/Power#
common shared /Count/Count %
common shared /HalfNumber/HalfNumber %
Number % = 4096
SampleRate# = 30000
ScanTime1# = 60.0
Call Initial1
Call GetData
Call TotalPower
n %=fmt(totalpowers$,"% s<% f",power#)
n %=writeline(1,"",0)
n %=writefile(1,"      squeak intensity = ",30)
n %=writeline(1,totalpowers$,stringlength(totalpowers$))
Sub Initial1
REM clears arrays, variables, and data acquisition board
HalfNumber % = Number %/2.0
Count % = 0
i % = 0
While i % < Number %
        InData %(i %) = 0.0
        FinalOut#(i %) = 0.0
i % = i % + 1
Wend
boardcode % = 11
i . . . ret % = Init.DA. Brds (3, boardcode %)
n % = 0
End Sub
Sub GetData
REM start the time and collect data from 0 to ScanTime1#
Inittime1# = timer
Checktime1# = 0.0
While Checktime1# < ScanTime1#
REM read the data acquisition board, store integer data in Indata %
        i..Ret % = DAQ.Op (3,7,1, Indata %(), 4096, SampleRate#)
        K % = 0
        m % = 0
        While K % < Number %
REM copy the data into two other arrays as real numbers
            InDataR#(K %) = InData %(K %)
            FTData#(K %) = InData %(K %)
K % = K % + 1
        Wend
REM perform Fourier Transform on data in FTData#
        call Spectrum (FTData#(), Number %)
REM accumulate Fourier Transforms into FinalOut# (real component
REM only)
        While m % < HalfNumber %
            FinalOut#(m %) = FinalOUT#(m %) + FTDATA#
            (m %) m % = m % + 1
        Wend
        Count % = Count % + 1
        Checktime1# = timer =Inittime1#
Wend
i % = 0
While i % < HalfNumber %
        FinalOut#(i %) = FinalOut#(i %)/count %
i % = i % + 1
Wend
End Sub
Sub TotalPower
REM calculates the squeak intensity
```

-continued

```
Squeak Testing Program

Sum# = 0.0
i % = 0
While i % < HalfNumber %
        Sum# = FinalOut#(i %) + Sum#
        i % = i % + 1
Wend
Power# = Sum # * (SampleRate#/Number %)
End Sub
End
```

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a method of forming a gasket of a polyurethane/urea composition along one or more edges of a substrate, comprising placing at least a portion of a substrate in a mold, injecting a solidifiable polyurethane/urea composition into a cavity space defined between the surface of said edge(s) of said substrate and the internal surface of said mold, and removing said substrate from said mold after solidification of said polyurethane/urea composition, the improvement wherein said polyurethane/urea composition comprises:

A) a (cyclo)aliphatic polyisocyanate having a viscosity of less than about 25,000 mPa·s at 25° C. and an average NCO functionality of 2.0 to 4.0, with B) an isocyanate-reactive component comprising:
  b1) from about 60 to 99% by weight, based on the weight of isocyanate-reactive components, of at least one compound having an average functionality of from 1 to 8 and a number average molecular weight of from about 401 to 10,000, and containing at least one of the functional groups selected from the group consisting of hydroxyls, amines, imines and mixtures thereof,
  b2) from about 1 to 40% by weight, based on the weight of isocyanate-reactive components, of an organic chain extender having a number average molecular weight of from 61 to 400, an average functionality of about 2, and being selected from the group consisting of alcohols, primary amines, secondary amines, aminoalcohols and mixtures thereof,
  b3) from about 0 to 15% by weight, based on the weight of isocyanate-reactive components, of an organic chain terminator having a molecular weight of from 32 to 400, an average functionality of about 1, and being selected from the groups consisting of alcohols, primary amines, secondary amines, or mixtures thereof, and
  b4) from about 0 to 20% by weight, based on the weight of isocyanate-reactive components, of an organic crosslinker having a molecular weight of from 90 to less than 400, an average functionality of greater than 2, and being selected from the group consisting of organic alcohols, organic amines, and mixtures thereof in the presence of C) from 0.1 to 10% by weight, based on the weight of isocyanate-reactive components, of at least one catalyst, wherein the reaction mixture is processed via the one-shot process at an isocyanate index of 80 to 115, and said A), b1), b2), and, optionally, b3) and b4) are selected such that the resultant polyurethane/urea composition has a crosslink density of at least 0.3 moles/kg.

2. The method of claim 1, wherein said (cyclo)aliphatic polyisocyanate is selected from the group consisting of methylenebis(cyclohexyl isocyanate) and 5-isocyanato-1-(isocyanatomethyl)-1,3,3-trimethylcyclohexane.

3. The method of claim 1, wherein said (cyclo)aliphatic polyisocyanate contains a functional group selected from the group consisting of
 a1) isocyanurate groups,
 a2) biuret groups,
 a3) uretdione groups,
 a4) urethane groups,
 a5) allophanate groups,
 a6) carbodiimide groups,
 a7) uretone imine groups and
 a8) blends thereof.

4. The method of claim 1, wherein said (cyclo)aliphatic polyisocyanate is based on 1,6-hexamethylene diisocyanate, contains both isocyanurate and allophanate groups, and has an isocyanate content of about 18 to 21% by weight, a viscosity of less than about 1500 mPa·s at 25° C., and a monomeric diisocyanate content of <0.7%.

5. The method of claim 1, wherein said isocyanate-reactive component comprises from 70 to 95% by weight of b1), and from 5 to 30% by weight of b2).

6. The method of claim 1, wherein said isocyanate-reactive component comprises no more than 10% by weight of b3).

7. The method of claim 1, wherein said isocyanate-reactive component comprises no more than 14% by weight of b4).

8. The method of claim 1, wherein b1) comprises at least one polyether polyol.

9. The method of claim 1, wherein b2) is selected from the group consisting of 1,4-butanediol, 1,3-butanediol, 2-methyl-1,3-propanediol, bis-(4-aminocyclohexyl)-methane, isophorone diamine, monoethanolamine and mixtures thereof.

10. The method of claim 1, wherein b3) is selected from the group consisting of n-butanol, 2-ethyl-1-hexanol, cyclohexylamine, dibutylamine and mixtures thereof.

11. The method of claim 1, wherein b4) is selected from the group consisting of diethanolamine, triethanolamine, trimethylolpropane, glycerol, pentaerythritol and mixtures thereof.

12. The method of claim 1, wherein said A), b1), b2), and, optionally, b3 and/or b4) are selected such that the resultant polyurethane/urea composition has a crosslink density of at least 0.35 moles/kg.

13. A gasket produced by the method of claim 1.

14. In a method of forming a window gasket of a polyurethane/urea composition along one or more edges of a glass plate, comprising placing at least a portion of a glass plate in a mold, injecting a solidifiable polyurethane/urea composition into a cavity space defined between the surface of said edge(s) of said glass plate and the internal surface of said mold, and removing said glass plate from said mold after solidification of said polyurethane/urea composition, the improvement wherein said polyurethane/urea composition comprises:

A) a (cyclo)aliphatic polyisocyanate having a viscosity of legs than about 25,000 mPa·s at 25° C. and an average NCO functionality of 2.0 to 4.0, with B) an isocyanate-reactive component comprising b1) from about 60 to 99% by weight, based on the weight of isocyanate-reactive components, of at least one compound having an average functionality of from 1 to 8 and a number average molecular weight of from about 401 to 10,000, and containing at least one of the functional groups selected from the group consisting of hydroxyls, amines, imines and mixtures thereof, b2) from about 1 to 40% by weight, based on the weight of isocyanate-reactive components, of an organic chain extender having a number average molecular weight of from 61 to 400, an average functionality of about 2, and being selected from the group consisting of alcohols, primary amines, secondary amines, aminoalcohols and mixtures thereof, b3) from about 0 to 15% by weight, based on the weight of isocyanate-reactive components, of an organic chain terminator having a molecular weight of from 32 to 400, an average functionality of about 1, and being selected from the groups consisting of alcohols, primary amines, secondary amines, or mixtures thereof, and b4) from about 0 to 20% by weight, based on the weight of isocyanate-reactive components, of an organic crosslinker having a molecular weight of from 90 to less than 400, an average functionality of greater than 2, and being selected from the group consisting of organic alcohols, organic amines, and mixtures thereof; in the presence of C) from 0.1 to 10% by weight, based on the weight of isocyanate-reactive components, of at least one catalyst, wherein the reaction mixture is processed via the one-shot process at an isocyanate index of 80 to 115, and said A), b1), b2), and, optionally, b3) and/or b4) are selected such that the resultant polyurethane/urea composition has a crosslink density of at least 0.3 moles/kg.

15. A window gasket produced by the method of claim 14.

* * * * *